Figure 1:
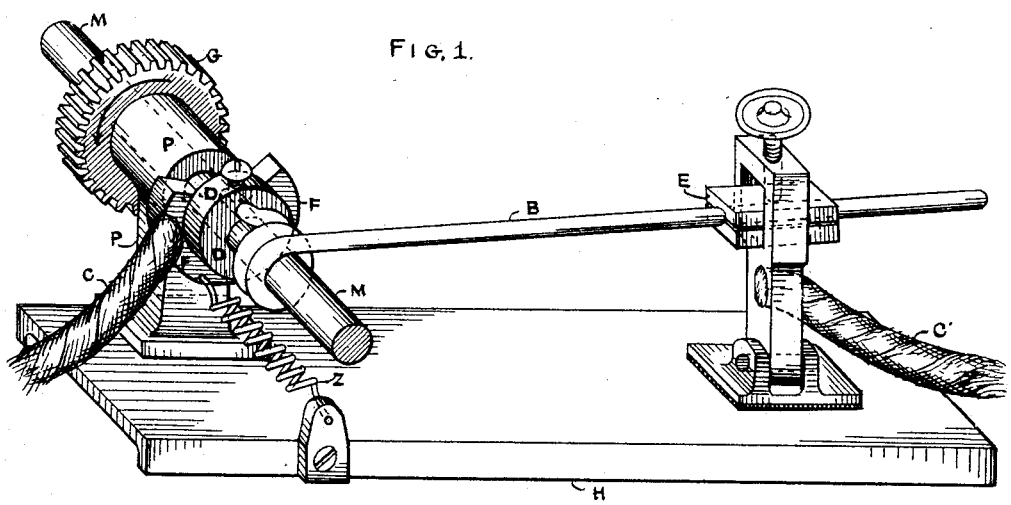

(No Model.) 3 Sheets—Sheet 1.

E. THOMSON.
METHOD OF ELECTRIC BENDING AND STRAIGHTENING.

No. 458,115. Patented Aug. 18, 1891.

ATTEST,
Wm H. Capel
Frank MacArthur

INVENTOR,
Elihu Thomson
By Townsend MacArthur
Attys (No Model.) 3 Sheets—Sheet 2.
E. THOMSON.
METHOD OF ELECTRIC BENDING AND STRAIGHTENING.
No. 458,115. Patented Aug. 18, 1891.
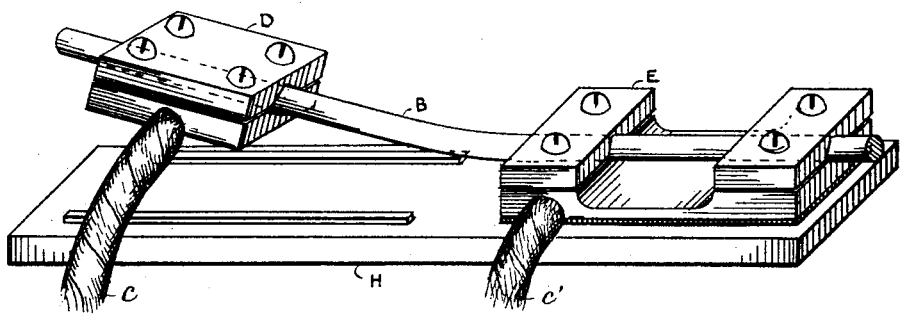
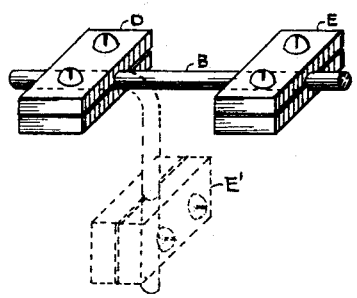
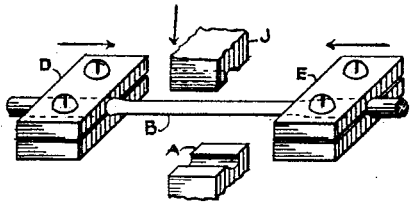
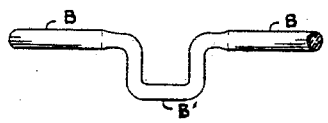

(No Model.) 3 Sheets—Sheet 3.
E. THOMSON.
METHOD OF ELECTRIC BENDING AND STRAIGHTENING.
No. 458,115. Patented Aug. 18, 1891.
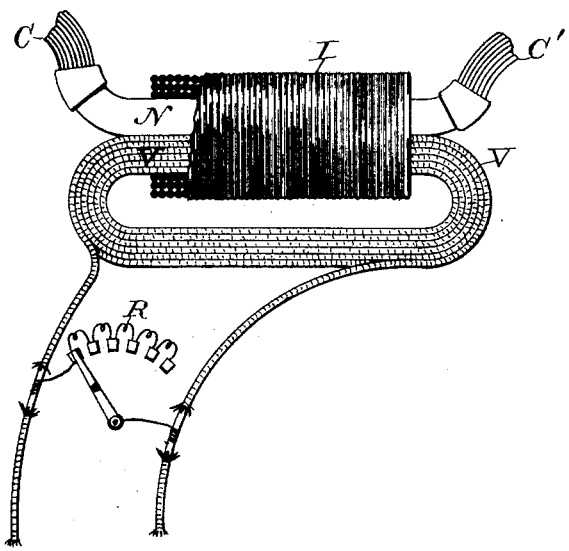
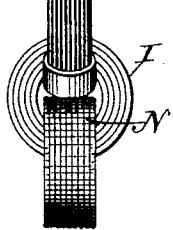
ATTEST:
J. A. Hurdle
Wm. H. Capel.
INVENTOR:
Elihu Thomson
By H. A. Townsend
Attorney

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

METHOD OF ELECTRIC BENDING AND STRAIGHTENING.

SPECIFICATION forming part of Letters Patent No. 458,115, dated August 18, 1891.

Original application filed May 21, 1886, Serial No. 202,842. Divided and this application filed March 2, 1888. Serial No. 265,968.

(No model.)

*To all whom it may concern:*

Be it known that I, ELIHU THOMSON, a citizen of the United States, and a resident of Lynn, in the county of Essex and State of Massachusetts, have invented a certain new and useful Method of Electric Bending and Straightening, of which the following is a specification.

The present invention relates to a new method or art in which the heating power of electric currents is utilized in bending, straightening, or forming metal bars or other shapes of metal and of various useful articles by passing heavy currents of very low electro-motive force through the pieces at the places where the work of bending, straightening, &c., is to be done.

The invention forming the subject of my present application was originally described and set forth in my prior application, filed May 21, 1886, Serial No. 202,842, of which application the present case constitutes a division.

Briefly, my invention consists in passing by suitable clamps a heavy electric current through the section or bar or other piece to be operated upon, so as to bring such section to a working heat irrespective of the other parts not to be forged or otherwise treated, and then bending or straightening by pressure or hammering or the application of force in such a manner as to move the heated particles in the direction required to give the product the intended or desired form or character.

My invention consists, further, in a novel process of shaping or forming metal, consisting in maintaining a given section or piece of metal to be worked in position in an electric circuit between two current-bearing electrodes or clamps until the same is heated to the desired plasticity, and then subjecting the heated metal to the action of a suitable forming or shaping device—such, for instance, as a plunger or die—that is normally out of connection with the metal while the current is passing through it.

My invention consists, further, in an improved metal-working art wherein heavy electric currents are employed, consisting in generating alternating electric currents by any suitable means, transforming the same into currents of lesser electro-motive force but larger volume, passing the said currents through the section or piece of metal to be heated until the same attains the desired plasticity, and then forming, shaping, or bending the metal into the desired form.

The accompanying figures will illustrate my invention in some of its applications.

It is assumed that the conductors mentioned herein lead from a source of very heavy electric currents, such as a secondary coil of an induction-coil of few turns whose primary is fed by alternating currents, or a secondary battery of large surface, or a dynamo-machine with very heavy conductors, &c. The force of the currents should be adjustable at will in any suitable manner to adapt them to the size and character of the part to be heated and formed. The same current-generating devices may be used as are described in prior applications filed by me for electric welding, the present invention differing from the former inventions referred to more particularly in the character of the work to be done.

The peculiar advantages of working metals under the heating effects of an electric current are more apparent where particular parts of a metal bar or similar object are to be treated as distinguished from the cases where a continuous piece of metal is to be subjected to the same treatment throughout its length.

Figure 2:
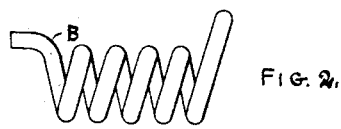
Figure 3:
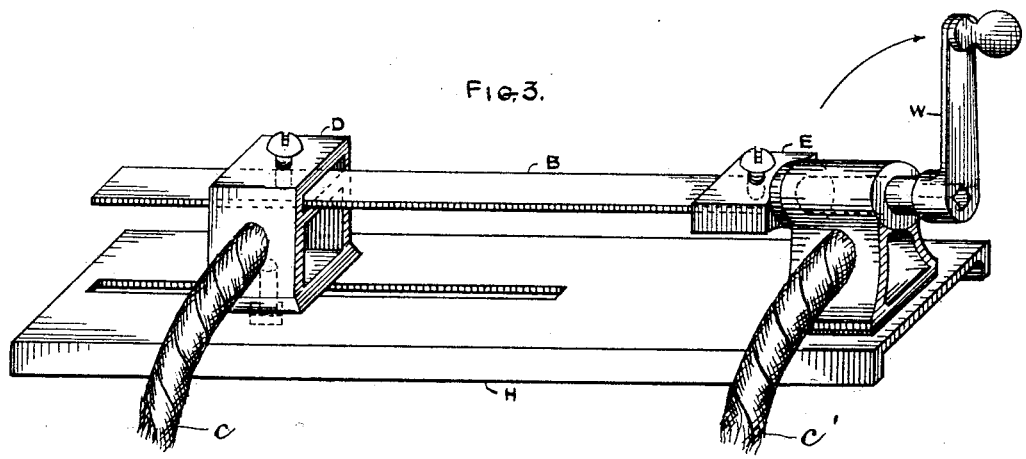
Figure 4:

In the accompanying drawings, Figure 1 illustrates an apparatus that may be used in carrying out one of the applications to which my invention is applicable. Fig. 2 shows the product of this operation. Fig. 3 illustrates a modified apparatus adapted to produce a different product. Fig. 4 shows the product thereof. Fig. 5 shows the application of my invention to straightening metal bars or pieces. Fig. 6 shows another application of my invention to bending. Figs. 7 and 8 illustrate a method of bending rods to form crank-shafts in accordance with my invention. Fig. 9 is a side elevation of the devices which are employed for transforming the alternating currents into the heating-currents, and Fig. 10 is an end view of the same.

In Fig. 1 is shown one of the ways of utilizing my invention in the way of bending metal rods—such as steel bars—for coiled springs suitable for heavy car-springs. A shaft or mandrel M, mounted so as to be rotatable at will by the gear G or otherwise and supported rigidly upon the pillar P, similar to or identical with a lathe-head, carries a dog or grip-piece D, adapted to grasp one end of the bar B to be bent, the other end of which latter can be clamped in a guide or holding-clamp E, so as to allow the bar B to slip through it endwise. The clamp E might be movable toward the mandrel M and firmly clamped to the bar B. Cables C C' convey current to D and E from a suitable source, so as to place the bar B in an electric circuit the current in which will be of sufficient volume to heat the bar, while the other parts of the circuit are made so massive and such good conductors as not to be heated to any considerable amount. The pillar P may be used to convey current, or a sliding contact F, held firmly with a spring Z, will suffice to convey current to a revolving surface carried by the mandrel. A few moments after the current is caused to traverse the bar B the latter heats and softens, and motion being then given to the mandrel M the bar B is easily bent into a spring or coil or bent as desired. The size of the bar that can be treated in this manner depends upon the capacity of the current to heat it and the massiveness of the apparatus.

Fig. 2 illustrates the coil formed as above described. Other dispositions of apparatus may be used, and I have designed several such for the same general purpose.

Fig. 3 illustrates another phase of my invention. Clamps D and E are used to hold and pass current to a square, flat, or other shaped bar or blank B, (which is shown flat in the figure,) C C' being the cables, as before. The distance of the clamps is generally made capable of variation by a slot in the bed-plate H, upon which a clamp, as D, can slide or be clamped, as needed, by a bolt entering said slot. Suitable guiding devices may be used to prevent the clamps from getting out of line. The clamp E is shown as attached to a rotary shaft borne in a suitable bearing, so that it may be rotated by the hand-wheel or other means W. There is of course no very low-resistance electrical connection from D to E, which are preferably well insulated from each other. When the current is passed through the apparatus, it heats the metal bar B between the clamps, and simultaneously with the passage of the current or shortly thereafter a twist is given by the rotating wheel W, the result of the operation, as shown in Fig. 4, being a form suitable, when the bar is made of steel, for wood-boring auger-stock or like purposes.

In Fig. 5 a heavy shaft or bar B is shown bent and gripped by the clamps D E, which are of considerable length, and are provided with V-shaped grooves to receive different sizes of bars. On account of the bend in the bar B between the clamps, the movable clamp D is not resting firmly on the bed H, where, should the bar be straight or be removed, it would rest in line true with clamp E by virtue of guides borne by the bed-plate, such as lathe-bed guides, the clamps D and E representing the heads of the lathes. The passage of the current through the conductors C C' brings the section of B containing the bend to a heated and flexible condition, allowing the clamp D to be set down on the bed H in a perfectly-true line with the clamp E. If the current be cut off, the bar B will cool while so held. If desired, force tending to separate D and E may also be applied to D during the straightening process, which force will tend to hold the bar B tense and straight.

In Fig. 6 I have shown how a sharp and limited bend may be obtained in a short section of a bar without heating its other portions. D and E, as before, are clamps and terminals, which convey current to the bar from any source in sufficient quantity. After the bar has been heated between the clamps a change of position of one or both clamps, as indicated by E', will give the bend desired. E may be pivoted to swing around a center to a definite point or be otherwise actuated. Sections of bar of a length less than twice the thickness of the diameter of the bar may thus be locally heated and bent to any angle.

In Fig. 7 the section of bar between the clamps after being heated by the current is arranged to be formed with four bends by a depressed plunger or die J, which comes down on an anvil A, the clamps D and E approaching each other at the same time. The result is a crank-shaft, as indicated at Fig. 8. If the clamps D and E are actuated so as to permit the ends of the bar B to approach in an axial line, the parts D and E will be true with each other.

It will be understood that my invention is not limited to the production of the particular forms and shapes of metal described, it consisting, essentially, as before described, in heating a particular part of a bar or piece of metal by a heavy electric current and then subjecting the parts so heated to a bending or straightening operation by means of suitable devices.

As a source of current for the practice of my invention ordinary dynamos or batteries are unsuitable where bars of any considerable size are operated upon, because of the enormous flow of current required and the very small electro-motive force needed. Current strengths, roughly estimated at from two thousand to one hundred thousand, are needed, according to the size of the bars or pieces operated upon, and much larger currents will be required for very large work. In practicing my invention, therefore, I employ alternating electric currents fed from any suitable source and transform said currents into currents of larger volume but lower electro-motive force, pass such low-tension currents of large volume through the section or portion of metal to be heated until the same has attained the desired plasticity, and then apply to the heated section of metal the desired forming or shaping action. For the purpose of transforming the currents I employ, by preference, an induction coil or apparatus in which the primary is fed by the alternating currents from an alternating-current machine, while the secondary consists, preferably, of a single bar of copper. Such a construction is illustrated in Figs. 9 and 10. N is a bar or bundle of rods of copper carried to the cables C C', which connect to the clamps before described. Alongside said bar is one side of a hollow coil of insulated wire V, oblong in shape, traversed, when desired, by varying strengths of alternating current obtained by inserting such coil in the circuit of an alternating-current dynamo and shunting it more or less, as indicated at R, (by a variable rheostat,) so as to regulate the flow of current and attain the desired heating effect. Around the two conductors N and V, which are of course insulated, is wound a mass of sheet-iron or iron wire I, passing through V, as indicated. The currents in V give rise to currents in N by induction, which are of very low electro-motive force and great volume, depending upon the size of the apparatus. The section of the bar N should be many times that of the bar or blank B to be operated upon, unless the specific conductivity of B is very low.

I am aware that it has been before proposed to roll rods, bars, plates, wires, rails, &c., by feeding the metal continuously through electrodes in such way that successive portions of the bar would be in turn brought into the electric circuit and passing the heated metal between rollers. The proposed method differs from mine first in the fact that in one form of the proposed invention the section of metal which is traversed by the heating-current is in contact continually with the rolls, whereas in my invention the former or die is not brought into contact with the section of metal heated while the current is passing through the same, and therefore the metal may be more readily and thoroughly heated, since the heat is not drawn away from it by means of the metal-working devices. It will be obvious, also, that in my method the section or piece of metal to be heated is maintained in position in the electric circuit between the current-bearing electrodes or clamps and rests in position for the necessary length of time to give it the desired heating, whereas in the heretofore-proposed method the point of connection of the current-bearing electrodes with the work is constantly shifting.

That particular modification of my invention herein described which relates to bending, straightening, twisting, coiling, or otherwise forming pieces of metal by including the section of metal to be treated in an electric circuit between two clamps or holders, passing an electric current from one to the other, and then imparting the proper movement to the end of the heated section by giving the proper movement to the clamp or connecting device attached to the metal, and which method is herein described and illustrated in Figs. 1 to 6, inclusive, as one of the ways in which my invention may be practiced, is not herein specifically claimed, as it forms the subject of claims in another application for patent filed by me, as a division of the present application, July 2, 1891, Serial No. 398,226.

What I claim as my invention is—

1. The herein-described improvement in metal-working, consisting in maintaining a continuous portion or given section of metal to be treated in position in an electric circuit between two current-bearing electrodes or clamps until the same is heated to the desired plasticity, and then subjecting the heated metal to the action of a suitable forming or shaping device—such, for instance, as a plunger or die—normally out of connection with the metal while the current is passing through it.

2. The herein-described improvement in metal-working operations, consisting in generating alternating electric currents by any desired means, transforming the same into currents of larger volume but lower electro-motive force, passing the said currents through the metal to be worked until the same attains the desired plasticity, and then shaping or forming the metal to give the product the intended or desired form or character.

3. The herein-described improvement in the art of metal-working, consisting in clamping the metal to be worked at two points, leaving a section of metal between them, passing a heavy electric current through such section of metal in volume sufficient to soften the same, and then subjecting the metal to the action of a forming or shaping device applied to the heated section.

4. The herein-described improvement in the art of metal-working, consisting in including the metal to be worked in an electric circuit between two current-bearing electrodes or clamps, maintaining the said metal in position between said current-bearing electrodes until the included section attains the desired plasticity, and then applying to the heated metal the desired shaping or forming instrument.

5. The herein-described improvement in the art of metal-working, consisting in clamping the metal to be worked at two points, leaving a section of metal between them, maintaining said given section in an electric circuit, passing a heavy electric current through such section of metal while it is maintained in position as a part of the electric circuit and in volume sufficient to soften the same, and then forming or shaping the said heated section to give the product the definite desired form or character.

6. The herein-described improvement in forming or shaping metals, consisting in clamping the metal to be worked between two current-bearing electrodes, so as to include the section of metal to be heated in an electric circuit, passing a heavy electric current through such section of metal in volume sufficient to soften the same, and then applying a suitable shaping or forming device to the metal, while permitting the clamp portions to move with relation to one another.

7. The herein-described improvement in shaping or forming metals, consisting in including a continuous metal piece or blank in an electric circuit, passing the heating-current through the same while it is out of contact with the shaping or forming devices, and then applying the desired shaping or forming instrument to the heated metal, as and for the purpose described.

8. The herein-described improvement in the art of metal-working, consisting in holding the metal to be worked in position in an electric circuit between two electrodes or clamps, transforming alternating electric currents into currents of larger volume but lower electro-motive force, passing the large-volume currents thus generated through the metal until the same is softened to the desired degree, and then forming or shaping the metal as desired.

9. The herein-described improvement in metal-working operations, consisting in generating alternating electric currents by any desired means, transforming the same into currents of larger volume but lower electro-motive force, passing the said currents through the metal to be worked and regulating the flow of current to attain the desired heating effect, and then shaping or forming the metal to give the product the intended or desired form or character.

10. The herein-described improvement in forming metal bars or blanks by the application of suitable forming-tools, consisting in passing a heating electric current through the given blank or section of metal while the same is out of contact with shaping or forming devices, and then applying the desired shaping or forming instrument.

Signed at Lynn, in the county of Essex and State of Massachusetts, this 22d day of December, A. D. 1887.

ELIHU THOMSON.

Witnesses:
WALTER C. FISH,
OTIS K. STUART.